United States Patent [19]

Kaucic

[11] Patent Number: 4,755,094
[45] Date of Patent: Jul. 5, 1988

[54] SELF-UNLOADING BARGE AND UNLOADING APPARATUS THEREFOR

[75] Inventor: Robert A. Kaucic, Newark, Del.
[73] Assignee: Express Marine, Inc., Camden, N.J.
[21] Appl. No.: 886,976
[22] Filed: Jul. 16, 1986
[51] Int. Cl.⁴ .............................................. B65G 67/60
[52] U.S. Cl. .................................. 414/145; 198/513; 198/518; 414/140
[58] Field of Search ............... 414/140, 143, 144, 145; 198/513, 518

[56] References Cited

U.S. PATENT DOCUMENTS

| | | | |
|---|---|---|---|
| 3,144,142 | 8/1964 | Wallace | 414/145 |
| 3,467,263 | 9/1969 | Auzins et al. | 414/140 |
| 3,847,290 | 11/1974 | Suykens | 414/145 |
| 4,230,220 | 10/1980 | Iino | 414/139 X |
| 4,334,818 | 6/1982 | Tingskog | 414/145 X |
| 4,443,148 | 4/1984 | Arnemann | 198/518 X |

FOREIGN PATENT DOCUMENTS 1051154 12/1966 United Kingdom ............... 414/144

OTHER PUBLICATIONS

PCT International Publication No. WO84/02112, Haahjem, published Jun. 7, 1984.
PCT International Publication No. WO84/01562, Aralt, published Apr. 26, 1984.

Primary Examiner—Leslie J. Paperner
Attorney, Agent, or Firm—Austin R. Miller

[57] ABSTRACT

A barge which is capable of offloading bulk cargoes to dockside without requiring assistance from onshore equipment or other floating equipment. The barge has a movable auger support housing and a to move the housing. An auger container is pivotably mounted to the housing with a rotating screwshaped auger mounted within the container. A first conveyor is located within the support housing to transport bulk cargo from the auger which lifts the cargo, from a lower level to a higher level, to a second conveyor located along the edge of the cargo hold. A moveable third conveyor is positioned to receive cargo from the second conveyor and to transport the material off the barge.

13 Claims, 2 Drawing Sheets

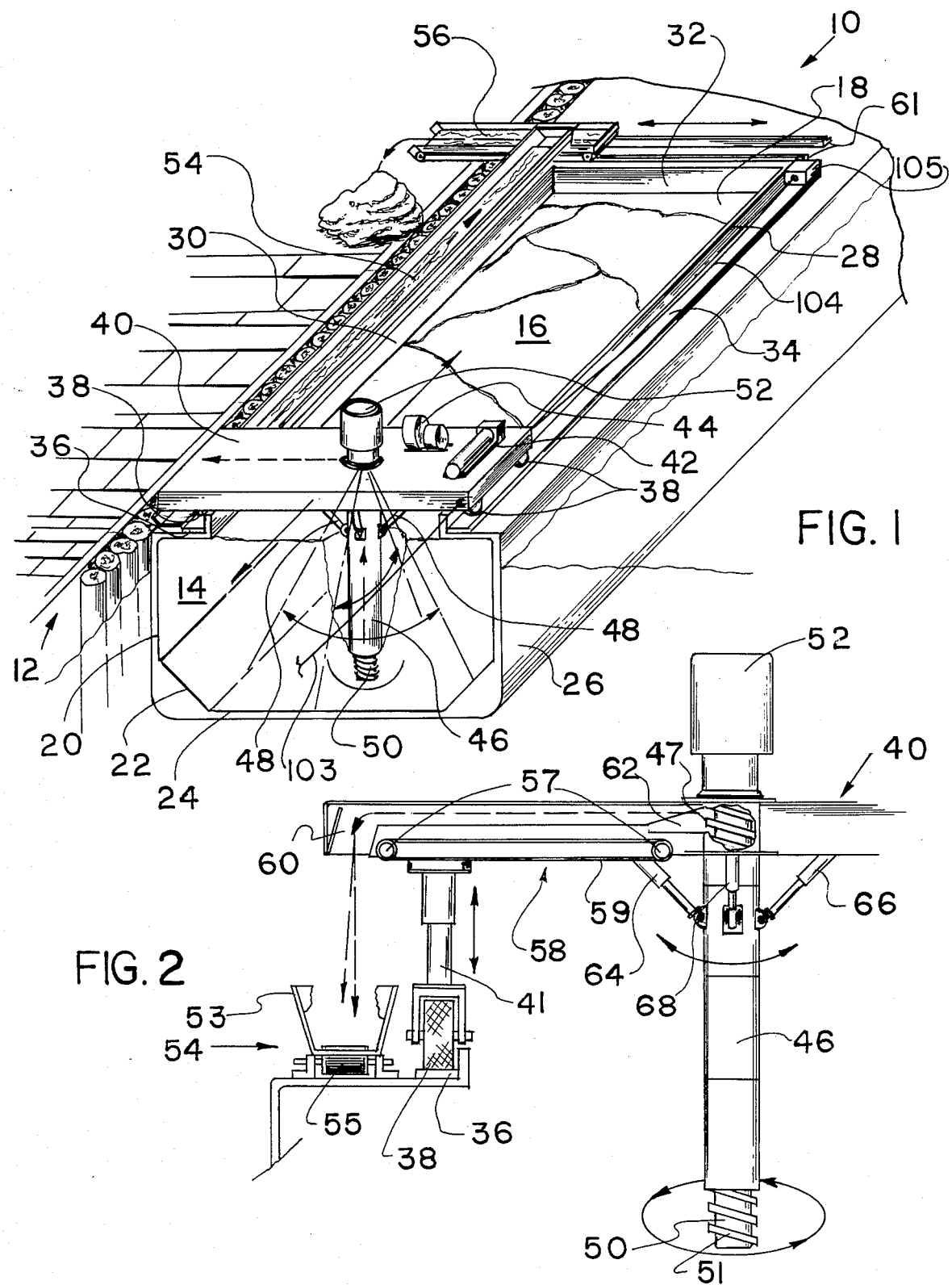

SELF-UNLOADING BARGE AND UNLOADING APPARATUS THEREFOR

BACKGROUND OF THE INVENTION

This invention relates to apparatus for unloading vessels such as barges, thereby making them self-unloading barges and the unloading apparatus contained therein.

FIELD OF THE INVENTION

It has been found that present onshore offloading facilities, when available, tend to be inadequate. For example, barges are typically hundreds of feet in length, with one or more cargo holds containing bulk cargo. In order to offload such a long barge, either the offloading equipment must be moved on the dock and along the length of the barge as each portion is emptied, or the barge must be moved.

Many offloading devices are permanently mounted in one place along the dock. This necessitates movement of the barge. Also, docksides, piers and moorings are frequently crowded with other vessels, or are of a length enabling the barge to be tied up in only one position. Further, docks and piers are typically crowded with an assortment of vehicles, small buildings, obstacles, offloaded cargoes and persons. This inhibits the effective movement of an onshore offloading device even if it is portable. In addition, the docks may also have to be reinforced to resist the added loads imposed by the onshore offloading devices.

DESCRIPTION OF THE PRIOR ART

Because of the many problems associated with onshore offloading facilities, it has been attempted to place offloading equipment on a barge. For example, U.S. Pat. No. 793,122 discloses a mechanism for coal-bunkering ships wherein a tower is mounted on rollers, and slides along the length of the barge. A shovel suspended within the tower is lowered into the hold of the barge to offload coal.

However, the shovel arrangement is severely limited in speed, in that it must be raised and lowered many times. Also, the tower can only lift the shovel vertically but not sideways. No means are provided by the barge or the tower to shift the shovel or its load horizontally from the barge to the ship.

Another critical problem is that the tower is quite tall. This is undesirable for a number of reasons. Typically, a tugboat pushes the barge from behind. With a large and complex tower mounted on the barge and in front of the tugboat, the operator of the tugboat is either partially or completely blinded by the tower as to objects in the forward path of the barge. Furthermore, a tall tower would not pass underneath many low bridges that typically cross over waterways utilized by barges.

A further critical problem with using a tall tower is that the tower raises the center of gravity of the barge. Any unstability that contributes to unwanted extra rolling or pitching of the barge could result in trouble in rough water.

U.S. Pat. No. 717,162 describes apparatus for handling coal or other material. A tower is rollably mounted on a barge. Included on the tower is a boom which horizontally transfers the coal off the barge after it has been lifted from below. However, the addition of the boom worsens the stability of the barge by further raising the center of gravity. Also, with the additional structure, the tower and boom require careful and constant monitoring and maintenance.

U.S. Pat. No. 2,660,319 describes an apparatus for loading and unloading cargo vessels which includes a telescoping boom mounted on a rollable frame. While there is no apparent problem with stability, the apparatus is not capable of unloading bulk cargoes, and is not capable of continuous unloading. No means are provided to collect and transport loose materials. Only cargo placed within a container can be unloaded.

OBJECTS OF THE INVENTION

Thus, it is an object of the present invention to provide a self-unloading vessel and the associated unloading apparatus which has a low center of gravity and is not susceptable to excessive rolling in rough waters or high seas.

It is another object of the present invention to provide a self-unlaoding vessel and apparatus therefor, which can be unloaded without having to move the vessel after tieing up or without having to move the cargo receiving apparatus alongside the dock.

It is an important object of the present invention to provide a self-unloading barge and apparatus therefor, which does not obstruct the forward view of a vessel pushing the barge, can pass underneath low overpasses and requires little maintenance.

It is another important object of the present invention to provide a self-unloading barge and apparatus therefor, which converts a conventional hopper barge into a self-unloading barge without extensive modifications in the hopper configuration.

It is a further object of the present invention to provide a self-unloading vessel and apparatus therefor, which unloads bulk cargoes in a continuous manner without assistance from onshore offloading facilities in a short period of time.

Other objects and advantages of the present invention will further become apparent to those skilled in the art from the drawings, the detailed description of preferred embodiments and the appended claims.

SUMMARY OF THE INVENTION

The present invention provides a barge which is capable of offloading bulk cargoes to dockside without requiring assistance from onshore equipment or other floating equipment. The barge has a movable auger support housing and means to move the housing. Auger containment means are pivotably mounted to the housing with a rotating screw-shaped auger mounted within the containment means. First conveyor means are located within the support housing to transport bulk cargo from the auger which lifts the cargo, from a lower level to a higher level, to second conveyor means located along the edge of the cargo hold. Moveable third conveyor means are positioned to receive cargo from the second conveyor means and to transport the material off the barge.

BRIEF DESCRIPTION OF THE DRAWINGS

FIG. 1 shows in perspective, with certain parts removed for ease of understanding, and taken partly in section, a self-unloading barge in accordance with the present invention.

FIG. 2 shows a front elevational view of an auger and support means mounted on a barge in accordance with the present invention.

Figure 3:
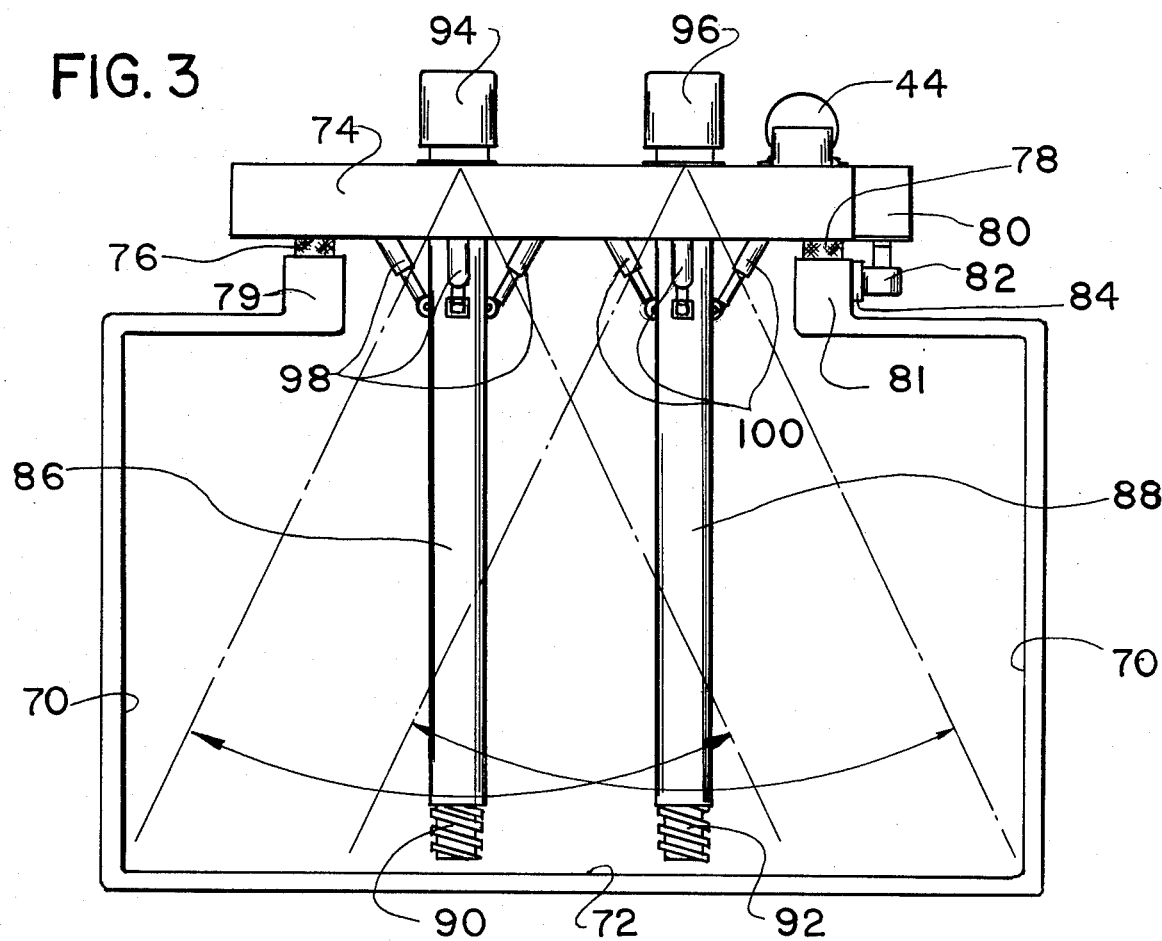
FIG. 3 shows a front elevational view taken in section, of an alternative embodiment of a self-unloading barge having two augers in accordance with the present invention.

DETAILED DESCRIPTION OF PREFERRED EMBODIMENTS OF THE INVENTION AND THE BEST MODE CONTEMPLATED FOR PRACTICE THEREOF

FIG. 1 shows a self-unloading barge 10 tied up to dock 12. Barge 10 has a hold 14 for carrying bulk cargo 16 which is onloaded through hatch opening 18. Hold 14 has vertical walls 20, angled walls 22 which are optionally vertical and bottom 24, all of which are interior of hull 26. Longitudinally opposing coamings 28 and 30, and transversely opposing coaming 32 (other coaming not shown) make up hatch opening 18. Trackways 34 and 36 lie adjacent coamings 28 and 30. Rollers 38 roll over the tops of trackways 34 and 36 and along coamings 28 and 30.

Rollers 38 are mounted to auger support housing 40 which extends over hatch opening 18. Drive motor 42 is mounted to housing 40 and connected to rollers 38 for movement of housing 40 along trackways 34 and 36. Alternatively, wires 103 and 104 are connected to motor 105 to move housing 40. Conveyor drive motor 44 drives a first conveyor (not shown) within housing 40. Also mounted to housing 40 is auger container 46 having opening 47 which can be pivoted by hydraulic members 48. Screw-shaped auger 50 with spiral thread 51 is rotatably mounted within auger container 46 and is connected to auger motor 52.

Second conveyor 54 runs alongside trackway 36 and into third conveyor 56 which runs alongside transversely opposing coaming 32 on rails 61 and over the edge of barge 10.

FIG. 2 shows auger support housing 40 with first conveyor 58 contained therewithin. First conveyor 58 is mounted on end rollers 57 with belt 59 connected thereto. Chute 60 provides a passageway for bulk cargo 16 for flow onto second conveyor 54. Second conveyor 54 transports bulk cargo 16 with belt 55. Bulk cargo 16 is contained therewithin by tray flanges 53. Pan 62 is mounted to auger container 46 to transfer bulk cargo 16 from auger container 46 to first conveyor 58.

Auger container 46 is pivoted transversely by transverse hydraulic members 64 and 66, and longitudinally by longitudinal hydraulic member 68 (and another member not shown). Screw-shaped auger 50 is rotatably mounted within auger container 46 and connected to auger motor 52. Housing 40 slides along trackway 36 on roller 38. Vertical hydraulic member 41 and another member not shown telescopically raise and lower housing 40 above rollers 38.

FIG. 3 shows an alternative embodiment of barge 10. The barge is provided with vertical walls 70 and flat bottom 72 which form the hold. A dual auger support housing 74 moves fore and aft over longitudinally opposing coamings 79 and 81 on rollers 76 and 78. Housing drive motor 80 is mounted on the side of housing 74 and has gear pinion 82 extending downwardly into contact with gear rack 84 which is affixed to coaming 81.

First and second auger containers 86 and 88 are carried by housing 74 and have first and second screw shaped augers 90 and 92 rotatably mounted therewithin. First and second auger drive motors 94 and 96 rotate first and second augers 90 and 92, respectively. First hydraulic members 98 are connected to housing 74 and first auger container 86, while second hydraulic members 100 are connected to housing 74 and second auger container 88.

Figure 4:
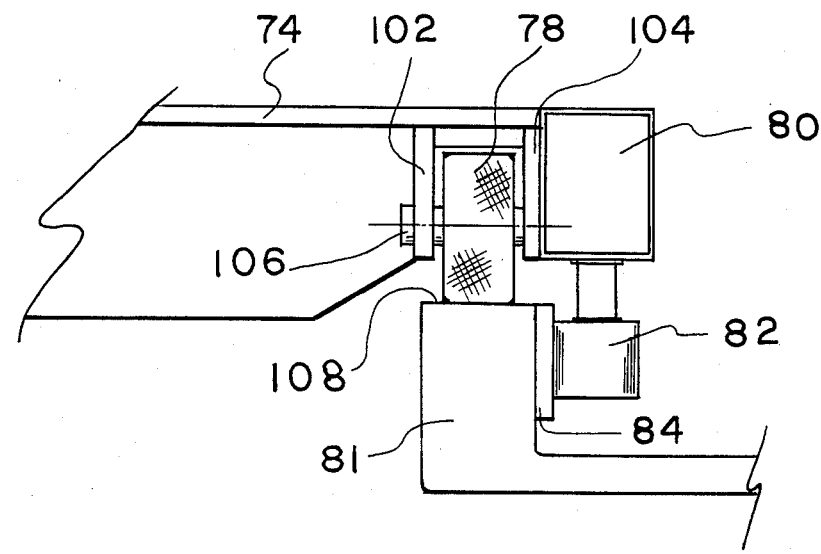
FIG. 4 shows an exploded front elevational view taken in section of housing movement and drive means in accordance with the present invention from FIG. 3.

FIG. 4 shows the drive means for housing 74 from FIG. 3. Housing 74 has housing drive motor 80 fixed to the side with gear pinion 82 extending downwardly therefrom. Gear pinion 82 engages gear rack 84 which is affixed to the side of coaming 81. Housing 74 also has a pair of spaced apart struts 102 and 104 containing an axle 106 on which roller 78 rotates. Roller 78 rolls over the top 108 of coaming 81.

Referring generally to FIGS. 1 and 2, barge 10 is typically brought alongside dock 12 by a tug. For the first time, it has been found that barge 10 can be tied up alongside any dock 12, pier or mooring and left unattended by the tug until barge 10 is completely unloaded. It is no longer necessary to have the tug remain on hand to periodically move barge 10 along dock 12 while offloading because of the self-unlodading capabilities of barge 10.

After tieing up, third conveyor 56 is slid along rails 61 so that bulk cargo 16 can be discharged into suitable transport means such as another conveyor or a truck or the like. Although it is preferred that third conveyor 56 slides along rails 61, it is possible to mount third conveyor on a pivot means to swing outboard of barge 10. Since hold 14 is full of bulk cargo 16, screw-shaped auger 50 is actuated by way of auger motor 52 to commence continuous offloading of barge 10.

As shown in FIG. 2, auger 50 rotates, which in turn rotates spiral thread 51. Bulk cargo 16 contacts spiral thread 51 and is pulled upward along the thread and into auger container 46. The walls of auger container 46 prevent bulk cargo 10 from falling off spiral thread 51 as it rises from a lower point to a higher point. Other auger configurations and designs more advanced than that described above, are known in the art and can be utilized for the mentioned transfer of bulk cargo 16. Only after bulk cargo 16 is lifted as high as opening 47 is the cargo allowed to exit auger container 46. From opening 47, bulk cargo 16 spills onto pan 62 and then slides onto belt 59 of first conveyor 58 for transport through chute 60 within housing 46. However, chute 60 may alternatively be replaced by a hopper or a container or the like which is mounted on and/or travels along with second conveyor 54. Although it is preferred to have housing 40 closed, it is possible to have it open to the elements for easy maintenance and viewing. Housing 40 is provided with vertical hydraulic member 41 and another member along coaming 28 connected to rollers 38 which telescopically raise and lower housing 40.

Upon exiting chute 60, bulk cargo 16 falls onto belt 55 of second conveyor 54 and is transported alongside longitudinal coaming 30. Although second conveyor 54 is depicted as being open to the elements, it can be covered with conventional coverings known in the art. At the end of second conveyor 54, bulk cargo 16 is transferred to third conveyor 56 for transport off barge 10. As with second conveyor 54, third conveyor of 56 can be similarly covered. Another configuration of housing 40 provides a first conveyor 58 which is slidable in the manner of third conveyor 56. In that case, first conveyor 58 is slid outboard of barge 10 and cargo 16 spills directly into collection means onshore, thereby eliminating the need for second and third conveyors 56 and 58. Although conveyors 54, 56, and 58 are shown to be belts in the drawings, it is possible to utilize alternative transporting means such as a screw or the like, for any or all of the depicted conveyors.

As hold 14 is emptied of bulk cargo 16, longitudinal hydraulic member 68, and another hydraulic member not shown, are actuated to pivot auger 50 longitudinally in order to lift out all bulk cargo from the end of barge 10. Either separately from or in concert with longitudinal hydraulic member 68, transverse hydraulic members 64 and 66 can be activated so as to pivot auger 50 transversely along the beam of barge 10 in order to lift all bulk cargo resting along angled walls 22. The combination of pivot movements enables auger 50 to pivot over a continuum of 360°. Auger 50 and housing 40 can be constructed in a manner that auger 50 is pivotable only transversely, only longitudinally or not at all. It is also possible to provide a tiltable housing 40 to effect further pivot action or to have a tiltable section built into housing 40. Vertical hydraulic member 41, in combination with another vertical hydraulic member alongside the opposing coaming, raises or lowers housing 40 as desired by the operator to facilitate unloading. It is possible to utilize other raising or lowering means or to use more than one vertical hydraulic member 41 per roller mechanism.

After substantially emptying one area within hold 14, or by any sequence of movements selected by the operator of the auger support housing 40, the housing 40 can be moved along trackways 36 and 38 perferably by actuating drive motor 42 in order to empty hold 14 from stem to stern in barge 10. It is also possible to activate motor 105 which pulls wire 104 to move housing 40. Another motor not shown pulls wire 103 to move housing 40 in the opposite direction. In cases where barge 10 has multiple holds 14, a housing 40 with an auger 50 can be placed over any or all of the holds. More than one housing 40 with an auger 50 can be mounted over each hold 14. Although the present invention describes housing 40 as moving fore and aft, it is possible for housing 40 to be positioned so as to move from port to starboard and back along transverse coamings. While it is preferred that drive motor 42 be mounted on either the port or starboard halves of housing 40, it is possible to mount drive motor 42 on the deck of barge 10 in connection with a pulley system in a manner to move housing 40 along trackways 34 and 36. Also, trackways 34 and 36 can be smooth or may have teeth, depending upon whether rollers 38 are smooth or have teeth.

Because auger 50 extends downwardly into hold 14, with housing 40 riding only slightly above hatch opening 18, forward visibility is preserved as is the critically important low center of gravity. The low profile of the vessel allows it to travel underneath low underpasses which are frequently encountered in smaller and more remote waterways.

Since the unloading apparatus is permanently mounted to the vessel, it can offload bulk cargoes at any dock, pier or mooring even if the facility has no onshore offloading capabilities. Uses of auger 50 and conveyors 54, 56 and 58 allow for unloading to be continuous and permit barge 10 to remain stationary during the entire operation without any movement along the pier or without any movement of onshore equipment along the pier.

Referring generally now to FIGS. 3 and 4, housing 74 with first and second augers 90 and 92 further increase operational flexibility in providing self-unloading barges. Barges with vertical walls 70 can be completely and efficiently unloaded because of the increased coverage of having first and second augers 90 and 92, which permits the omission of angled walls (for example, angled walls 22 in FIG. 1) in order to increase cargo capacity. As with barge 10 in FIG. 1, drive motor 80 moves housing 74 fore and aft. However, housing 74 can also be mounted transversely in the case where the barge contains multiple holds. It is also possible to mount drive motor 80 on either side of housing 74, with gear rack 84 attached to the side of coaming 79. Housing 74 can also be raised and lowered relative to the cargo in the manner of housing 40 in FIG. 2.

Housing 74 contains conveyor means such as a belt or screw which travels past both augers 90 and 92 to transport cargo. Conveyor drive motor 44 drives the conveyor means. Augers 90 and 92 are similarly pivotable in the directions and manner as auger 50 in FIG. 1. With such flexibility in pivot movement, existing barges can easily and inexpensively be retrofitted with the apparatus of the present invention.

Although this invention has been described in connection with specific forms thereof, it will be appreciated that a wide array of equivalents may be substituted for the specific elements shown and described herein without departing from the spirit and scope of this invention as described in the appended claims.

I claim:

1. Apparatus for unloading a vessel comprising:
    a vessel-mounted carriage movably mounted over a hold in said vessel such that said carriage extends over said hold;
    means to move said carriage back and forth over said hold;
    an auger carried by said carriage on its upper end and having a free engaging tip portion on its lower end, said lower end being integral with said upper end and extendable into the cargo for directly contacting and collecting said cargo for continuously directly lifting said cargo from a lower point within said hold to a higher point;
    means connected to rotate said auger;
    pivot means operatively connected to said auger for pivotal movement relative to said carriage, said pivotal movement including rotation of said lower end about a vertical axis extending downwardly from said upper end over a continuum of 360 degrees; and
    conveyor means carried by said carriage and movable with said carriage to receive and convey cargo from said auger.

2. Apparatus as defined in claim 1 further comprising second conveyor means mounted alongside said hold to receive and convey cargo from said conveyor means carried by said carriage at any point.

3. Apparatus as defined in claim 2 further comprising third conveyor means mounted at either end of said second conveyor means to receive and convey cargo from said second conveyor means off of said vessel.

4. Apparatus as defined in claim 1 wherein said carriage is mounted on rollers.

5. Apparatus as defined in claim 1 wherein means are provided for causing said carriage to move back and forth on opposing coamings of said hatch opening.

6. Apparatus as defined in claim 4 wherein said means to move said carriage is a motor mounted to said carriage and connected to said rollers.

7. Apparatus as defined in claim 4 wherein said means to move said carriage is mounted to said vessel and connected to said rollers.

8. Apparatus as defined in claim 1 wherein said conveyor means carried by said carriage comprises a conveyor belt.

9. Apparatus as defined in claim 2 wherein said second conveyor means comprises a conveyor belt.

10. Apparatus as defined in claim 3 wherein said third conveyor means comprises a conveyor belt.

11. Apparatus as defined in claim 1 further comprising means connected to raise and lower said auger relative to said cargo.

12. Apparatus as defined in claim 1 wherein a second auger having an engaging portion extendable into the cargo for contacting and collecting said cargo for continuously lifting said cargo from a lower point within said hold to a higher point is carried by said carriage.

13. Apparatus as defined in claim 12 wherein pivot means is operatively connected to said second auger for pivotal movement relative to said carriage.

* * * * *